United States Patent [19]

Kurt

[11] 4,410,821

[45] Oct. 18, 1983

[54] SLIP-RING ARRANGEMENT FOR ELECTRICAL MACHINES

[75] Inventor: Thoma Kurt, Birr, Switzerland

[73] Assignee: BBC Brown, Boveri & Company, Limited, Baden, Switzerland

[21] Appl. No.: 320,438

[22] Filed: Nov. 12, 1981

[30] Foreign Application Priority Data

Nov. 13, 1980 [CH] Switzerland ............ 8417/80

[51] Int. Cl.³ ............................................. H02K 9/28
[52] U.S. Cl. ............................................. 310/227; 310/232
[58] Field of Search ................. 310/227, 232, 54, 58, 310/59, 52

[56] References Cited

U.S. PATENT DOCUMENTS

| 3,784,855 | 1/1974 | Motegi | 310/227 |
| 4,137,474 | 1/1979 | Krieger | 310/227 |
| 4,334,159 | 6/1982 | Ooki | 310/227 |

FOREIGN PATENT DOCUMENTS

| 135609 | 11/1933 | Austria | 310/227 |
| 504351 | 7/1930 | Fed. Rep. of Germany | 310/227 |
| 854970 | 5/1950 | Fed. Rep. of Germany | 310/227 |
| 1488655 | 6/1970 | Fed. Rep. of Germany | 310/227 |
| 55-4685 | 4/1980 | Japan | 310/227 |
| 410152 | 10/1966 | Switzerland | 310/227 |

*Primary Examiner*—R. Skudy
*Attorney, Agent, or Firm*—Oblon, Fisher, Spivak, McClelland & Maier

[57] ABSTRACT

A slip-ring arrangement for electrical machines, especially asynchronous machines, for the directional elimination of heat and for the removal of brush abrasion elements having several slip rings, located next to one another, the slip rings being provided with axial cooling-gas bores which are intersected by grooves or slots in each slip-ring surface. These cooling-gas bores are guided—separately for each slip ring—through axially extending insulating tubes to a suction fan, preferably a radial fan so that heat lost is eliminated directly at its point or origin.

9 Claims, 7 Drawing Figures

SLIP-RING ARRANGEMENT FOR ELECTRICAL MACHINES

BACKGROUND OF THE INVENTION

1. Field of the Invention

The present invention relates to a slip-ring arrangement for electrical machines.

2. Description of the Prior Art

An arrangement of this general type is known from German Auslegeschrift No. 1,488,655. The transfer of current from brushes to slip rings is known to involve losses, specifically in the form of frictional and current-passage losses, the quantity of heat arising having to be eliminated by means of a ventilation system governed by the amount of losses which occur. In the conventional cooling arrangement for slip rings, an air flow is guided along the brush surface and, if appropriate, also through axial and/or radial channels in the slip rings.

In slip-ring arrangements for turbo-generators, as are known, for example, from Swiss Patent Specification No. 443,468, three radial fans are provided between two slip rings, the middle fan sucking fresh air in through axial bores in both slip rings and the outer fans each sucking fresh air in along the surface of one slip ring, all three conveying the heated air outwardly.

Swiss Patent Specification No. 410,152 relates to a slip-ring arrangement with a device for cooling the slip rings by means of a coolant blown through channels in the slip rings, and in this arrangement slots or grooves present in the slip-ring surface intersect with parallel-axis channels in the slip-ring body, the gaseous coolant being fed to these channels via channels extending approximately radially. In a further development of this known slip-ring arrangement, German Offenlegungsschrift No. 2,426,823 proposes forcing the coolant flow through the channels by means of a radial fan located between the slip rings.

In slip-ring arrangements for asynchronous machines, in which there are, as a rule, three slip rings located comparatively close to one another, the cooling concepts known in turbo-generators cannot be implemented in practice. In most cases, the space existing between the individual slip rings is too slight to accomodate fans and appropriate coolant-conveying devices. There has, therefore, been no shortage of attempts in the past to solve the problem of cooling several slip rings located next to one another.

Thus, German Patent Specification No. 504,351 describes an arrangement for cooling the slip rings and for removing the brush dust in which a slip-ring support designed as a hollow body is connected at one axial end to an air suction hose and is provided on its periphery with air inlet orifices located between the slip rings. Special air-guide attachments are fitted to the slip-ring support outside the air inlet orifices for the purpose of directional air guidance. The suction hose is connected to a vacuum line. This known solution is expensive in terms of construction, leads to a substantial enlargement of the slip-ring diameter and has, in particular, the disadvantage that it does not permit direct cooling of the contact surface of the slip ring.

In a slip-ring arrangement known from German Auslegeschrift No. 1,488,655, for electrical machines with several slip-rings located next to one another, such slip rings are worked into these channels and are provided with inlet and outlet orifices for supplying and discharging a gaseous coolant. The slip rings are made hollow, and the interior is connected via the inlet orifices at several points distributed along the periphery, to insulated tubes which each lead to the end face of the outermost slip ring. In this case, the outlet orifices are formed by oblique bores leading radially outwardly in the end walls of the slip ring. Alternatively, passages can also lead from the interior of the slip rings to the slip-ring surface, in which case, according to the particulars of this Auslegeschrift No. 1,488,655, the brushes have to be arranged so that they do not cover these outlet orifices.

Although the slip-ring arrangement permits directional flow of coolant to the individual slip rings, nevertheless it essentially possesses two disadvantages. On the one hand, the cost in terms of construction is increased considerably as a result of the design of the slip rings as hollow bodies, and, on the other hand, the coolant flow described causes serious fouling of the brush space, which can impair freedom of movement of the brushes in their holders and also jeopardize the insulation, that is to say, such considerably reduces the tracking resistance. Furthermore, the supply or discharge of coolant, which is presently desirable, is, if possible, guided by the contact surface of the brushes and thus expressly allows the heat to be eliminated directly at its point of origin.

SUMMARY OF THE INVENTION

The object of the present invention is to provide a slip-ring arrangement which does not have the disadvantages of the prior art, permits a highly effective cooling of the slip rings, especially in their surface region, largely avoids fouling of the brush space as a result of brush abrasion elements and, at the same time, is of an extraordinarily simple construction.

The advantages of the invention, intended especially for asynchronous machines, in comparison with the prior art are to be seen, in particular, in the following:

1. The gas flow is guided specifically by the contact surfaces of the slip rings, namely directly at the points where the current-transfer losses arise;

2. Because the gas is guided in the insulating tubes, all the slip rings are ventilated equally, the allocation of the quantities of gas is clearly defined, are parallel guidance of the gas stream is simple to supervise and to compute;

B 3. The installation of insulating tubes results in the fact that there is only comparatively minor interference with existing slip-ring concepts, so that, basically, conventional arrangements can be converted to the system according to the invention;

4. The brush abrasion elements are sucked away directly at their point of origin; and 5. All the insulating tubes lead to the same fan, thus resulting in a saving of space.

According to a first embodiment of the present invention, the axial bores in the slip rings are designed as through-bores, while the insulating tubes are closed at the end facing away from the radial fan and are inserted into the axial through-bores approximately one slip-ring width and are provided at the inserted end with lateral orifices directly radially outwards. This embodiment is distinguished by a simple design and the possibility of enconomical production.

Alternatively to this embodiment, there is, however, the possibility of designing the axial bores in the slip ring to be connected to an insulating tube as blind-hole bores which are open towards the radial fan and into which blind-hole bores the insulating tubes emerge. Here too it is recommended to completely introduce the insulating tubes into the blind-hole bores and to provide the insulating-tube ends located inside the slip rings with lateral orifices directed radially outwardly. In both embodiments mentioned above, the insulating tubes are pressed into the axial bores of the slip rings or are glued or cemented therein.

The fan preferably designed as a radial fan has, on its end face turned towards the slip rings, a plurality of bores corresponding to the number of insulating tubes, the insulating tubes opening into these bores. In this case, the fan blades are dimensioned so that they reach to a point located below the lower edge of the insulating tubes. Initial rotational losses are eliminated in this manner.

Instead of a radial fan, it is also possible to use a fan arrangement to which the ends of the insulating tubes facing away from the slip rings are guided through a supporting ring and are bent radially outwardly behind the supporting ring. Tubes which are arranged radially outwardly and are closed at the radially inner end and to which the axially extending insulating tubes are connected laterally can also replace a radial fan. Although these embodiments entail increased fan losses, they are nevertheless more economical when employed where there are less onerous cooling requirements.

BRIEF DESCRIPTION OF THE DRAWINGS

Various other objects, features and attendant advantages of the present invention will be more fully appreciated as the same becomes better understood from the following detailed description when considered in connection with the accompaying drawings in which like reference characters designate like or corresponding parts throughout the several views and wherein.

DETAILED DESCRIPTION OF THE PREFERRED EMBODIMENTS

Figure 1A:
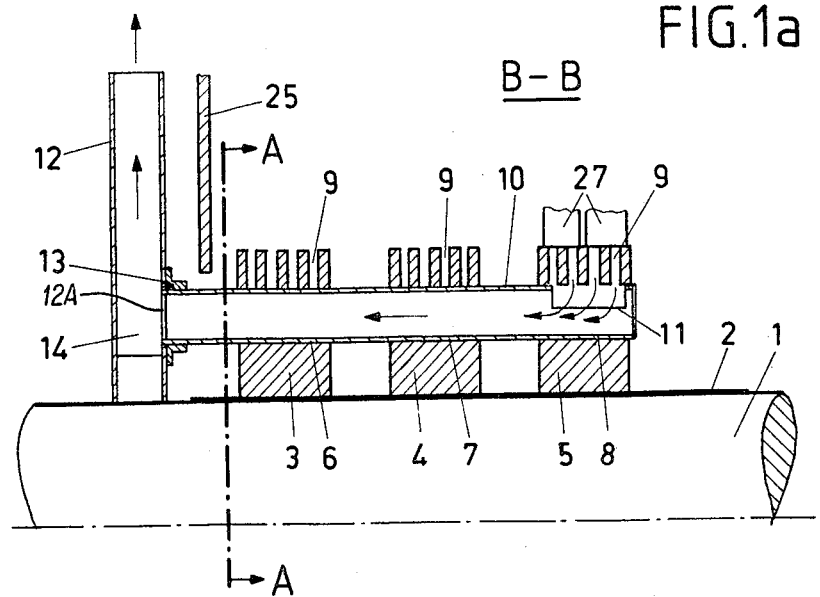
FIG. 1a, FIG. 1b, and FIG. 1c show different longitudinal sectional views of an exemplary embodiment of a slip-ring embodiment utilizing a radial fan.
Figure 1B:
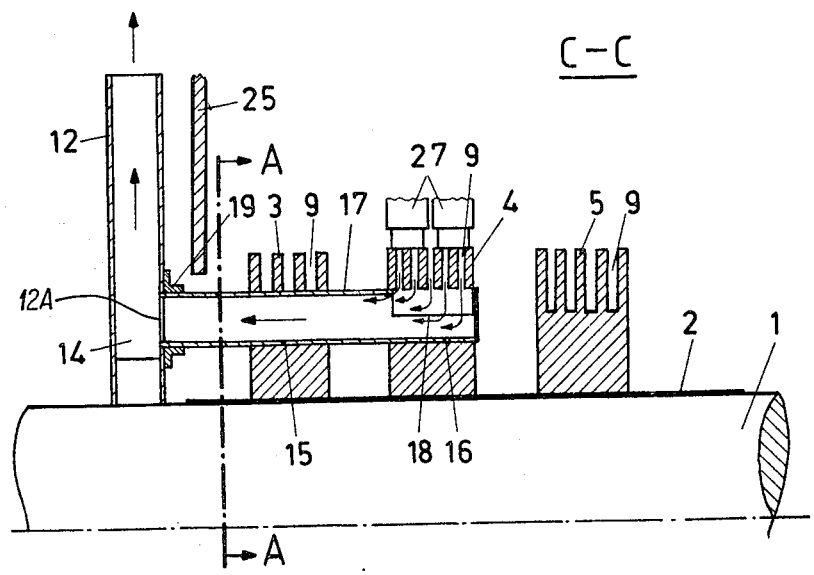
Figure 1C:
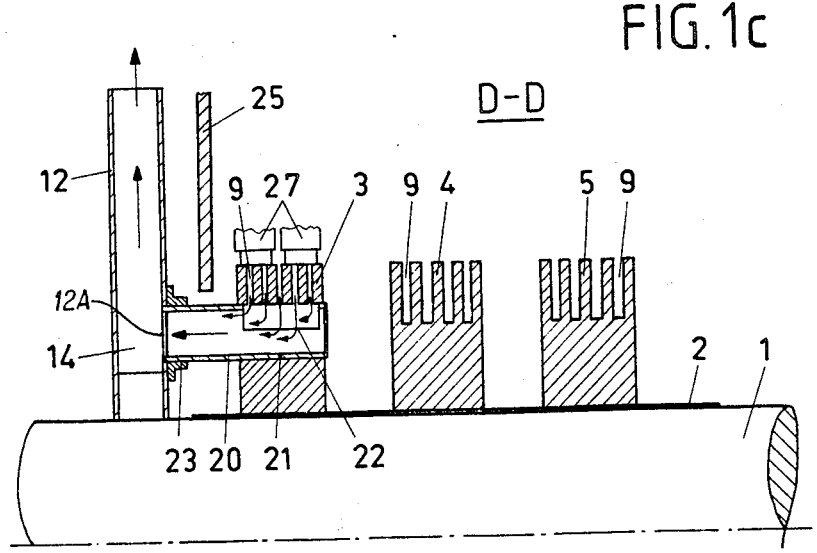

According to FIGS. 1a to 1c, three slip rings 3–5 are fastened to a shaft 1 of an electrical machine, in the present case an asynchronous machine, with insulation 2 placed between rings which are 3–5 and shaft 1. Slip rings 3–5 in the longitudinal section which are to be considered first all have axially extending through-holes or blind-holes 6–8, respectively, aligned with one another. Spirally extending grooves or slots 9 in the surface of slip rings 3–5 extend into through-holes 6–8 and intersect with them.

Figure 5:
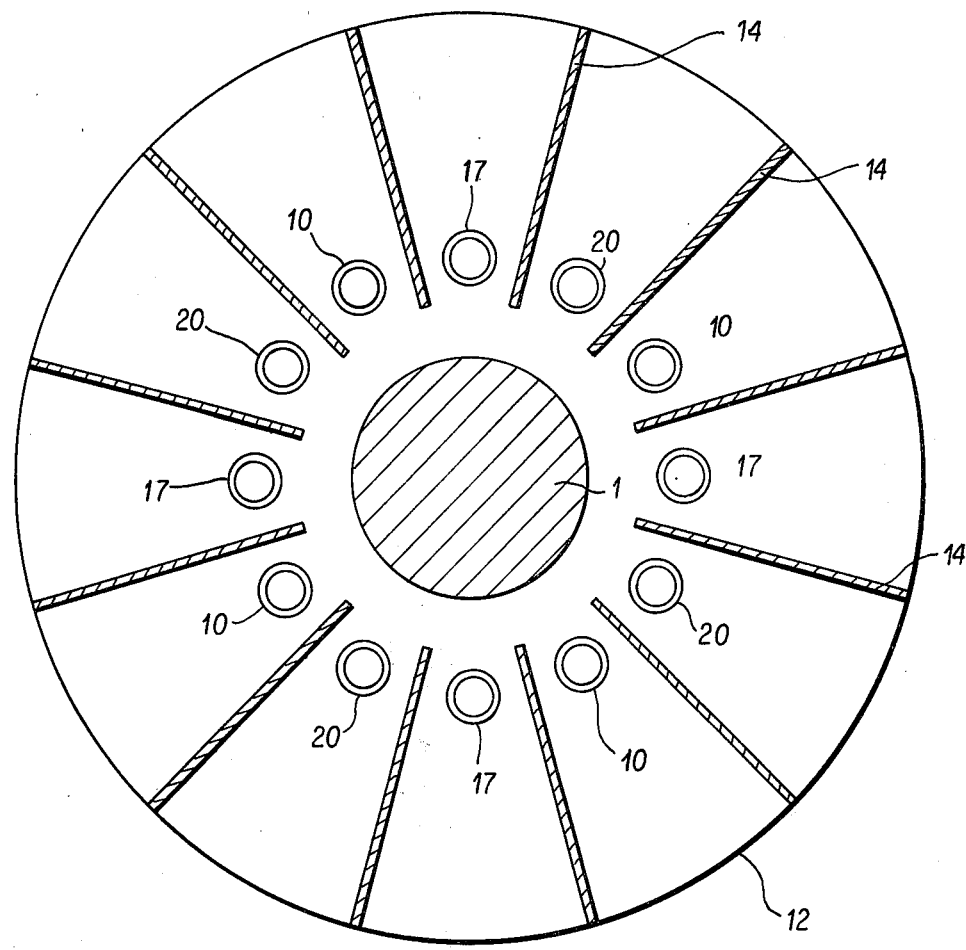
FIG. 5 shows a front elevational view of the fan.

An insulating tube 10 which is closed at the outer end face of slip ring 5 leads through through-holes 6–8. In the region of the passage of insulating tube 10 through slip ring 5, insulating tube 10 includes an orifice 11 directed radially outwards. Thus, the interior of insulating tube 10 is connected to slots 9 of the slip ring 5 and, consequently, to the outside via orifice 11. As is evident from the radial sectional view of FIG. 2, four insulating tubes 10 distributed uniformly over the periphery are assigned to slip ring 5. At their free ends insulating tubes 10 open into a hole 12A in radial fan 12 (also see FIG. 5) fastened to shaft 1 and are there held, for example, by being pressed, glued, cemented or screwed, in flange-like projections 13. Initial rotational losses are eliminated by extending fan blades 14 of radial fan 12 down to a point located below the lower end of insulating tube 10.

The cooling connection of slip ring 4 is illustrated in the longitudinal sectional view of FIG. 1b. Slip rings 3 and 4 are provided with axially extending through-holes 15 and 16 which are aligned with one another and through which an insulating tube 17 is guided. In accordance with FIG. 1a, insulating tube 17 is closed at the end face of slip ring 4 facing slip ring 5 and has, in the region of the passage through slip ring 4, an orifice 18 directed radially outwardly. Insulating tubes 17 constitute four tubes in number and are distributed uniformly over the periphery (FIG. 2) and also open into radial fan 12 via flange-like projections 19.

Slip ring 3 is connected for cooling purposes, according to FIG. 1c, in a similar manner. Insulating tubes 20 are located in axial bores 21 of slip ring 3. Insulating tubes 20 are closed at the end face of slip ring 3 facing slip ring 4. In the region of the passage through slip ring 3, insulating tubes 20 orifices 22 formed therein are directed radially outwardly and open into radial fan 12 via flange-like projections 23.

Figure 2:
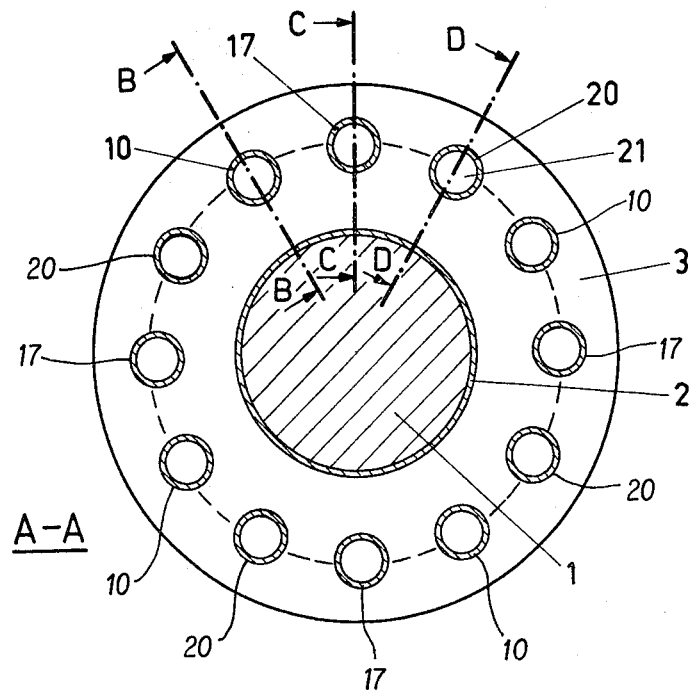
FIG. 2 shows a radial sectional view of the embodiment of FIG. 1b taken along line A—A.

Slip ring 5 has four axial through-holes formed therein, slip ring 4 has eight, four of which serve to house insulating tubes 10, and slip ring 3 has twelve through-holes, eight of which—as is evident from FIG. 2—serve to house insulating tubes 10 and 17.

FIG. 1a also illustrates diagrammatically how the air flowing out of radial fan 12 is blown. In the case of open machines, the heated cooling air can be blown directly into the open, if appropriate with filters and/or louvers being interposed therein. To prevent short circuiting of the cooling-gas supply, the outflow space of radial fan 12 can be separated from the slip-ring space by a fixed screen 25 between slip ring 3 and radial fan 12, although this is not compulsory.

Figure 3:
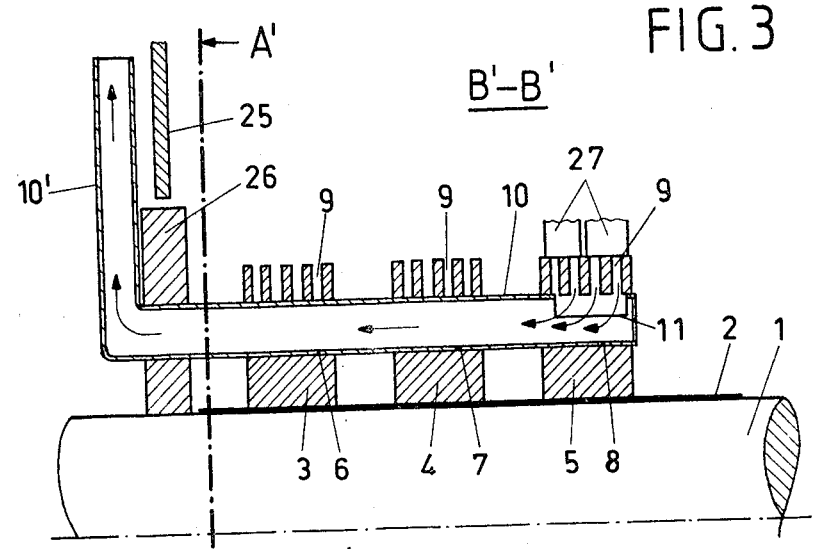
FIG. 3 shows a longitudinal sectional view of a second exemplary embodiment of a slip-ring arrangement in which specially designed insulating-tube ends assume the function of a radial fan.
Figure 4:
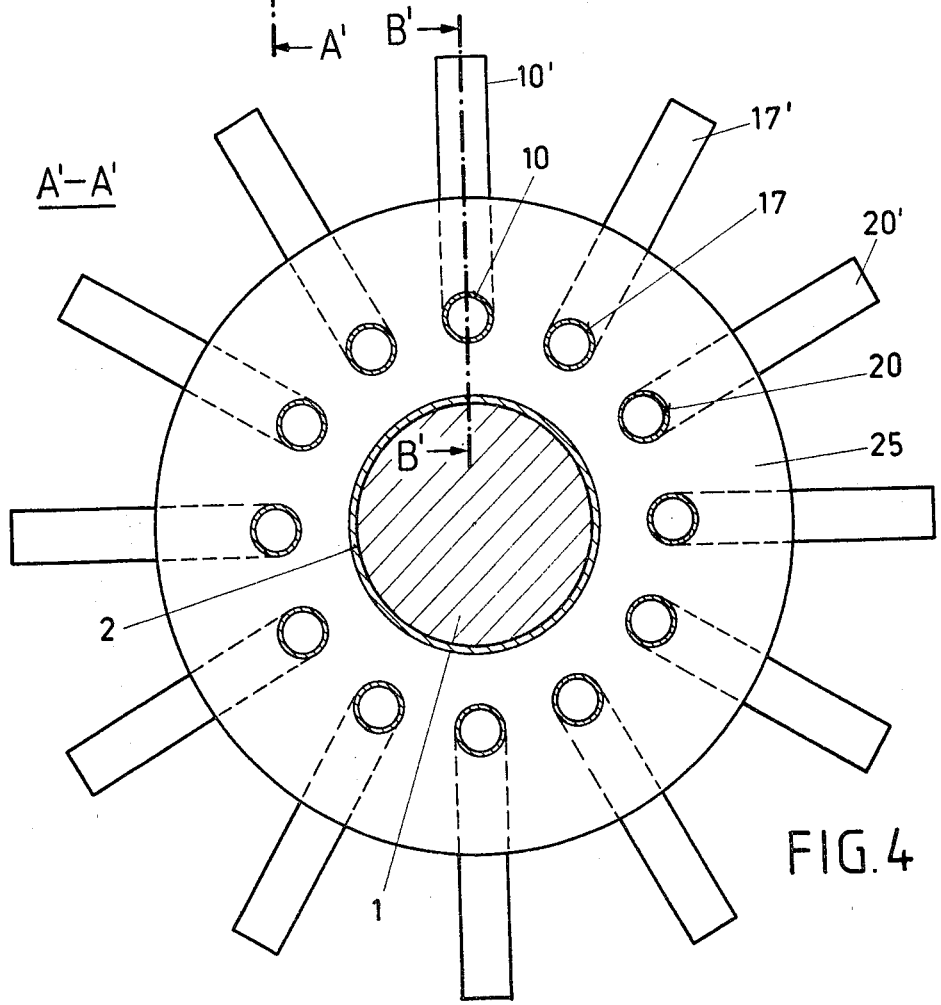
FIG. 4 shows a radial sectional view of the embodiment according to FIG. 3 taken along the A'—A'.

FIG. 3 and FIG. 4 (in which partition wall 25 is not shown) illustrate a second embodiment of the present invention in which a cooling-gas conveying arrangement, acting essentially in the same manner as the first embodiment, serves to replace radial fan 12. The design of slip rings 3–5 and their connection to insulating tubes 10, 17 and 20 are the same as in the embodiment shown in FIGS. 1a, 1b, 1c and FIG. 2. In contrast to such embodiment, ends 10', 17' and 20' of insulating tubes 10, 17 and 20 which face away from slip rings 3–5 are guided through a supporting ring 26 and are bent radially outwardly behind supporting ring 26. Ends 10', 17' and 20' of insulating tubes 10, 17 and 20 project radially outwardly beyond supporting ring 26 and are open at such point. In a manner similar to FIG. 1a, the partial streams of cooling gas flowing out of the radially outwardly bent ends of the insulating tubes are blown to atmosphere. To prevent short circuiting of the cooling-gas supply, the outflow space of the fan arrangement can be separated from the slip-ring space by a fixed partition wall or bulkhead 25 on a level with supporting ring 26.

When the machine is in operation, cooling gas is sucked in through insulating tubes 10, 17 and 20 by fan 12. The (cold) cooling gas passes through grooves or slots 9 in the surface of slip rings 3–5, and through orifices 11, 18 and 22 directed radially outwardly in insulating tubes 10, 17 and 20 into the latter. Since cold cooling gas is also sucked away under brushes 27, the net result is that, in addition to the cooling effect on the brushes and the slip ring, brush abrasion elements are sucked away directly at their point of origin.

For the sake of clear illustration, the drawings have omitted showing of (electrical) a current supply or a current discharge to and from slip rings 3–5, respectively. In the exemplary embodiments described, the electrical connection of the slip rings is made on the side of the slip-ring arrangement facing away from the fan, for example by means of one or more busbars or current-carrying bolts for each slip ring, the busbars assigned to slip rings 3 and 4 being carried while being insulated through corresponding bores in slip rings 4 and 5, respectively.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A slip-ring arrangement for electrical machines comprising:
   a fan;
   at least first and second slip rings axially positioned adjacent one another, each of said first and second slip rings having a plurality of axially extending, aligned cooling-gas holes formed therein and a radially extending slot formed therein in communication with said holes and through which air is drawn; and
   an axially extending insulating tube mounted in and interconnecting each of said holes, a first end of said tube being closed and a second end of said tube being connected to and, communicating with said fan and through which said air is discharged to said fan.

2. A slip-ring arrangement as set forth in claim 1, wherein said holes further comprise through-holes and said insulating tube is mounted in each of said holes so as to extend a distance equal approximately to the width of each of said at least first and second slip rings, said insulating tubes having lateral orifices formed therein at said first end and which are directed radially outwardly so as to communicate with said slot of at least one of said first and second slip rings.

3. A slip-ring arrangement as set forth in claim 1, wherein said holes further comprise axially extending blind-holes formed in each of said first and second slip rings and wherein said insulating tube is mounted in each of said blind-holes, said insulating tube having lateral orifices formed therein at said first end and which are directed radially outwardly so as to communicate with said slot of at least one of said and second slip rings.

4. A slip-ring arrangement as set forth in claim 2 or 3, further comprising means for rigidly mounting said insulating tube in each of said holes.

5. A slip-ring arrangement as set forth in claim 1, said fan having a plurality of holes formed therein axially aligned with said insulating tube mounted in each of said holes of said first and second slip rings wherein said insulating tube mounted in each of said holes of said first and second slip ring communicates with each of said plurality of fan holes.

6. A slip-ring arrangement as set forth in claim 5, wherein said fan further comprises a plurality of fan blades, each of said fan blades extending radially inwardly beyond a lower edge portion of said insulating tube.

7. A slip-ring arrangement as set forth in claim 1, further comprising a partition wall positioned between said fan and said first and second slip rings.

8. A slip-ring arrangement for electrical machines comprising:
   a shaft;
   a supporting ring attached to said shaft;
   at least a first and second slip ring axially positioned adjacent one another, each of said first and second slip rings having a plurality of axially extending, aligned cooling-gas holes formed therein and a radially extending slot formed therein in communication with said holes and through which air is drawn, each of said first and second rings having a contacting surface; and
   an axially extending insulating tube mounted in and interconnecting each of said holes and connected at a first end of said tube to said supporting ring on a first side thereof and a radially outwardly projecting end portion connected to said supporting ring on a second side thereof opposite said first side, said radially outwardly projecting end portion extending radially beyond said contact surface of each of said first and second slip rings and wherein a second end of said tube opposite said first end is closed.

9. A slip-ring arrangement as set forth in claim 8, further comprising a partition wall position between radially outwardly projecting end portion of said insulating tube and said first and second slip rings.

* * * * *